United States Patent
Ding et al.

(10) Patent No.: US 11,030,548 B1
(45) Date of Patent: *Jun. 8, 2021

(54) PROBABILISTIC INFERENCE IN MACHINE LEARNING USING A QUANTUM ORACLE

(71) Applicant: Google LLC, Mountain View, CA (US)

(72) Inventors: Nan Ding, Los Angeles, CA (US); Masoud Mohseni, Redondo Beach, CA (US); Hartmut Neven, Malibu, CA (US)

(73) Assignee: Google LLC, Mountain View, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/413,273

(22) Filed: May 15, 2019

Related U.S. Application Data

(63) Continuation of application No. 14/484,039, filed on Sep. 11, 2014, now Pat. No. 10,339,466.

(60) Provisional application No. 61/876,744, filed on Sep. 11, 2013.

(51) Int. Cl.
*G06N 20/00* (2019.01)
*G06N 10/00* (2019.01)
*G06N 7/00* (2006.01)

(52) U.S. Cl.
CPC .............. *G06N 20/00* (2019.01); *G06N 7/005* (2013.01); *G06N 10/00* (2019.01)

(58) Field of Classification Search
None
See application file for complete search history.

(56) References Cited

U.S. PATENT DOCUMENTS

| | | |
|---|---|---|
| 2009/0075825 A1 | 3/2009 | Rose |
| 2012/0084242 A1 | 4/2012 | Levin |
| 2012/0254586 A1 | 10/2012 | Amin |
| 2013/0144925 A1 | 6/2013 | Macready |
| 2014/0187427 A1 | 7/2014 | Macready |
| 2014/0223224 A1 | 8/2014 | Berkley |
| 2014/0337612 A1 | 11/2014 | Williams |
| 2014/0344322 A1 | 11/2014 | Ranjbar |
| 2015/0006443 A1 | 1/2015 | Rose |
| 2015/0052092 A1 | 2/2015 | Tang |
| 2015/0111754 A1 | 4/2015 | Harris |
| 2015/0161524 A1 | 6/2015 | Hamze |
| 2015/0317558 A1 | 11/2015 | Adachi |
| 2015/0363708 A1 | 12/2015 | Amin |

(Continued)

OTHER PUBLICATIONS

Denil et al, Toward the Implementation of a Quantum RBM (Year: 2011).*

(Continued)

*Primary Examiner* — Daniel T Pellett
(74) *Attorney, Agent, or Firm* — Fish & Richardson P.C.

(57) ABSTRACT

Methods, systems, and apparatus, including computer programs encoded on computer storage media, for using a quantum oracle to make inference in complex machine learning models that is capable of solving artificial intelligent problems. Input to the quantum oracle is derived from the training data and the model parameters, which maps at least part of the interactions of interconnected units of the model to the interactions of qubits in the quantum oracle. The output of the quantum oracle is used to determine values used to compute loss function values or loss function gradient values or both during a training process.

10 Claims, 7 Drawing Sheets

(56) References Cited

U.S. PATENT DOCUMENTS

2016/0071021 A1 3/2016 Raymond
2016/0132785 A1 5/2016 Amin
2016/0162798 A1 6/2016 Marandi
2016/0321559 A1 11/2016 Rose
2017/0017894 A1 1/2017 Lanting

OTHER PUBLICATIONS

Bian et al., QUBOs for Machine Learning, 2009, 29 pages.
Danchev et al "Totally Corrective Boosting with Cardinality Penalization," arXiv 1504.01446v1, Apr. 7, 2015, 16 pages.
Denchev et al. "Robust Classification with Adiabatic Quantum Optimization," arXiv 1205.1148v2, May 30, 2012, 17 pages.
Denil et al, Towards the Implementation of a Quantum RBM Year: 2011.
Dong et al, Quantum Reinforcement Learning, 2008.
Hoehn et al. "A Quantum Post—"Lock and Key" Model of Neuroreceptor Activation," Scientific Reports, Dec. 1, 2014, 31 pages.
Liu et al, The Algorithm and Application of Quantum Wavelet Neural Networks, 2010.
Macready et al. "Structured Classification using Binary Quadratic Programmes," D-Wave Systems, SFU and Google, Nov. 25, 2008, 20 pages.
Neven et al, Training a Binary Classifier with the Quantum Adabiatic Algorithm, 2008.
Neven et al. "Image recognition with an adiabatic quantum computer I. Mapping to quadratic unconstrained binary optimization," arXiv 0804.4457v1, Apr. 28, 2008, 7 pages.
Neven et al. "QBoost: Large Scale Classifier Training with Adiabatic Quantum Optimization," JMLR Workshop and Conference Proceedings, 2012, 16 pages.
Neven et al. "Training a Binary Classifier with the Quantum Adiabatic Algorithm," arXiv0811.0416v1, Nov. 4, 2008, 11 pages.
Neven et al. "Training a Large Scale Classifier with the Quantum Adiabatic Algorithm," arXiv 0912.0779v1, 14 pages.
Pudenz et al, Quantum adiabatic machine learning, 2011.
Smelyanskiy et al, A Near-Term Quantum Computing Approach for Hard Computational Problems in Space Exploration, 2012.

\* cited by examiner

PROBABILISTIC INFERENCE IN MACHINE LEARNING USING A QUANTUM ORACLE

CROSS-REFERENCE TO RELATED APPLICATIONS

This application is a continuation application of, and claims priority to, U.S. patent application Ser. No. 14/484,039, titled "PROBABILISTIC INFERENCE IN MACHINE LEARNING USING A QUANTUM ORACLE," filed on Sep. 11, 2014, which application claims the benefit under 35 U.S.C. § 119(e) of U.S. Provisional Patent Application No. 61/876,744, titled "Probabilistic Inference in Machine Learning Using a Quantum Oracle", filed on Sep. 11, 2013. The disclosure of each of the foregoing applications is incorporated herein by reference.

BACKGROUND

This specification relates to using a quantum oracle in probabilistic inference in machine learning of models, including Boltzmann machines and undirected graphical models.

SUMMARY

The core of artificial intelligence and machine learning problems is to train a parametric model, e.g., a Boltzmann machine or an undirected graphical model, based on the observed training data, which may include labels and input features. The training process can benefit from using a quantum oracle for probabilistic inference. Input to the quantum oracle during training is derived from the training data and the model parameters, which maps at least part of the interactions of interconnected units of the model to the interactions of qubits in the quantum oracle. The output of the quantum oracle is used to determine values used to compute loss function values or loss function gradient values or both during a training process. The quantum oracle may also be used for inference during the prediction stage, i.e., at the performance stage, during which loss functions of different candidate output labels are compared.

The details of one or more embodiments of the subject matter of this specification are set forth in the accompanying drawings and the description below. Other features, aspects, and advantages of the subject matter will be apparent from the description, the drawings, and the claims.

DETAILED DESCRIPTION

Overview

Figure 1:
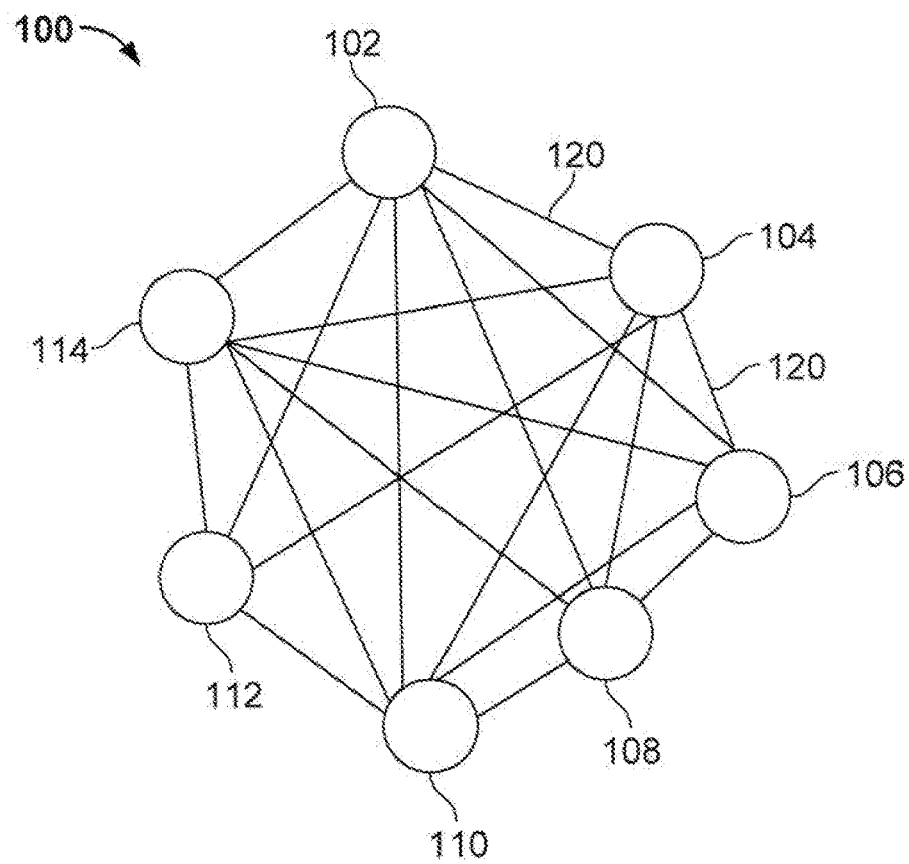
FIG. 1 is a schematic diagram of an example unrestricted Boltzmann machine.

Computer models can be trained to solve difficult and interesting problems, e.g., a wide range of machine learning problems such as classification problems, pattern matching problems, image recognition problems, speech recognition problems, voice recognition problems, or object recognition problems.

Useful models include Boltzmann machines, undirected graphical models, or stochastic recurrent neural networks. During training, model parameters are determined with the goal that the trained model optimally fits the labeled observed data from any of the problems to be solved. Part of or the entire training of the model can be computationally intractable, depending on the size or complexity of the model, or both. For example, the time in order required to collect equilibrium statistics for probabilistic inference can grow exponentially with the size (e.g., number of parameters or units in a network) of the model.

This specification will describe how a quantum oracle can be used to train a model, in particular when probabilistic inference of the model or part of the model is computationally intractable. A quantum oracle can be implemented using a quantum machine as will be described. An example quantum machine is any of the D-Wave superconducting adiabatic quantum computing (AQC) systems (available from D-Wave Systems Inc., British Columbia, Canada). Other alternative quantum information processors can also be used as quantum oracles. Some of these processors can perform universal AQC without being limited by 2-local stochastic Hamiltonians and can perform arbitrary or universal quantum operations in the adiabatic regime. Other quantum processors can perform computations based on a circuit model of computation with discrete logical gates including, e.g., trapped ion systems, neutral atoms in optical lattices, integrated photonic circuits, superconducting phase or charge qubit architectures, nitrogen-vacancy in diamonds, solid-state NMR (nuclear magnetic resonance) systems, and quantum dot structures.

Generally, input to the quantum machine is derived from the model to be trained and the training data, and the quantum machine outputs the desired equilibrium statistics for the trained model. The derivation of the input takes into consideration the structure of the model and the physical structure of the quantum machine. For the D-Wave system, the input has a QUBO (Quadratic Unconstrained Binary Optimization) format. In other words, during training, one or more computational tasks of a model are mapped into a QUBO problem for the quantum machine to solve. For example, when an undirected graphical model has the same structure as the hardware connectivity of the quantum machine (e.g., the D-Wave system), exact inference is made. In other implementations, e.g., when the model is a densely connected graph such as a Boltzmann machine, the quantum machine (e.g., the D-Wave system) is applied in part of the inference to improve the power of the model by adding more interactions between variables than are provided traditional methods.

In some cases, the quantum oracle is used in minimizing a loss function of the model to be trained.

Adiabatic Quantum Computing (AQC) Processors

Figure 2:
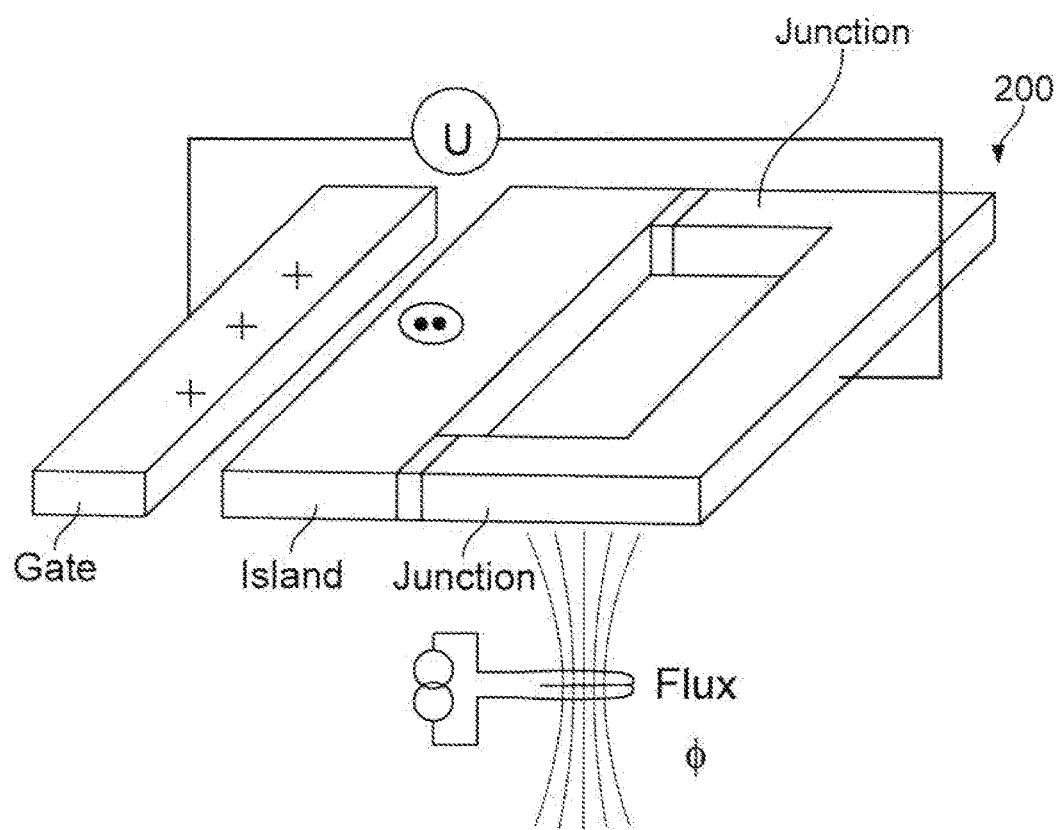
FIG. 2 is a schematic perspective view of flux qubits in a quantum machine.
Figure 3:
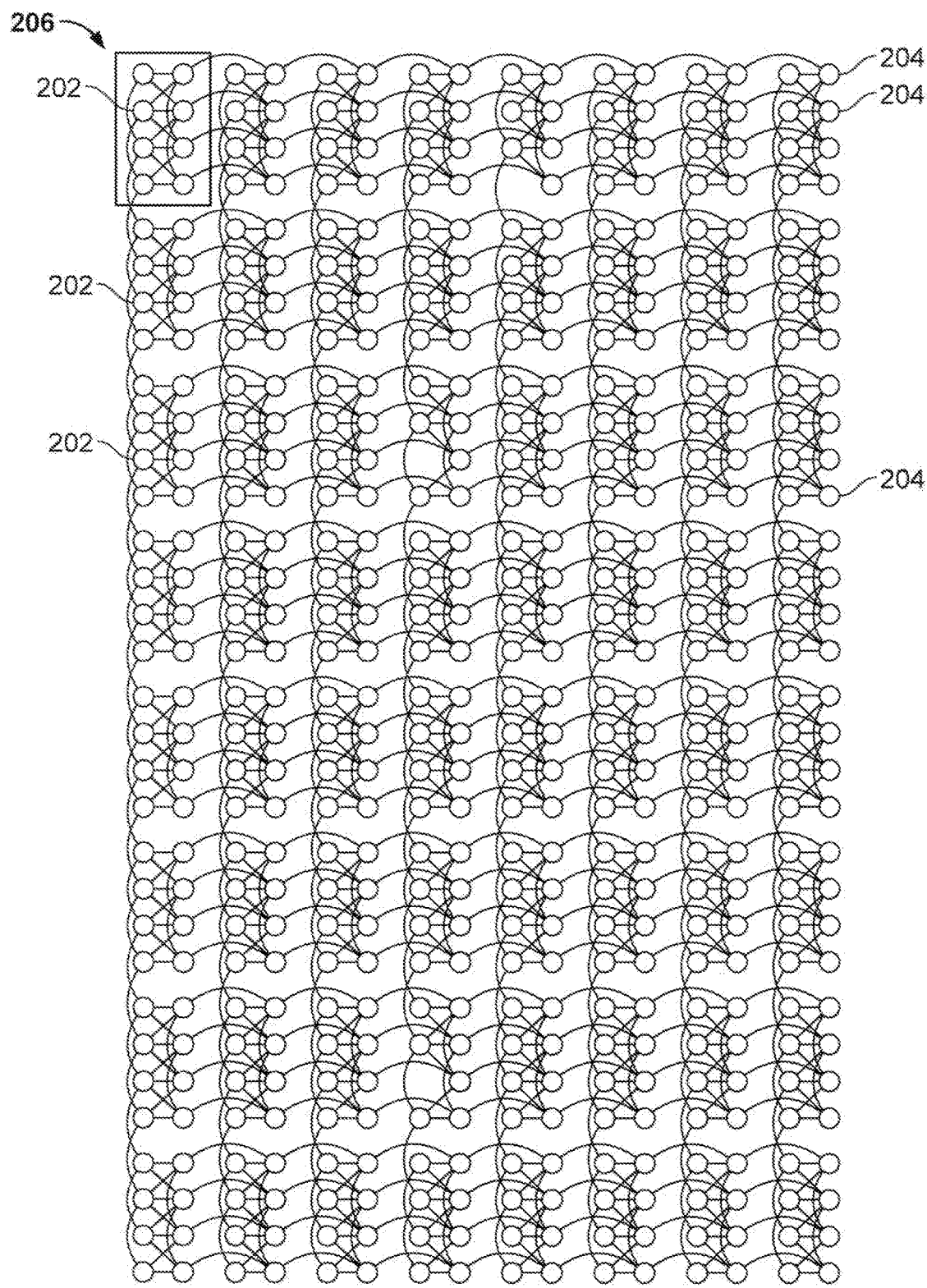
FIG. 3 is a Chimera graph showing interacting qubits on an example chip of a quantum machine.

As shown in FIG. 2, in a conventional D-Wave system, qubits are formed with superconducting Niobium loops 200. As shown in FIG. 3, the D-Wave system contains a chip 206 that includes 8 by 8 unit cells 202 of eight qubits 204, connected by programmable inductive couplers as shown by lines connecting different qubits. Generally, a chip of qubits will be made with a number of qubits that is a power of 2, e.g., 128 or 512 or more qubits. The qubits and couplers between different qubits can be viewed as the vertices and edges, respectively, of a Chimera graph with a bipartite structure.

The chip 206 is a programmable quantum annealing chip. At the end of quantum annealing schedule, the initial transverse Hamiltonian is vanished and the global energy becomes an eigenvalue of the problem Hamiltonian which can be expressed as:

$$E(s_1, \ldots, s_N) = \sum_{i=1}^{N} h_i s_i + \sum_{i<j=1}^{N} J_{ij} s_i s_j$$

Where $s_i$ represents the ith qubit and is binary:
$s_i \in \{-1, +1\}$;
N is the total number of qubits in use; and
$h_i, J_{ij} \in \mathbb{R}$ Different problems to be solved can be defined by the different input, real parameters $h_i$ and $J_{ij}$, which can be derived from training data. The sparsity of the parameter $J_{ij}$ is constrained by the hardware connectivity (i.e., the connectivity of the qubits shown in FIG. 3). For disconnected qubits, the corresponding $J_{ij}$ is 0.

In searching for a ground state for the global energy defined by a particular problem, adiabatic quantum annealing is applied. By defining a Hamiltonian for a problem to be solved and inputting the parameters of the Hamiltonian, a machine learning training system can use the chip to perform quantum annealing to reach a global ground state, at which point the chip outputs the state of each qubit 204, e.g., in the form of a bit string:

$$s^* = \underset{s}{\operatorname{argmin}} E_{Ising}(s) = \underset{s}{\operatorname{argmax}} \left\{ \sum_{i,j} s_i J_{ij} s_j + \sum_i h_i s_i \right\}$$

Figure 4A:
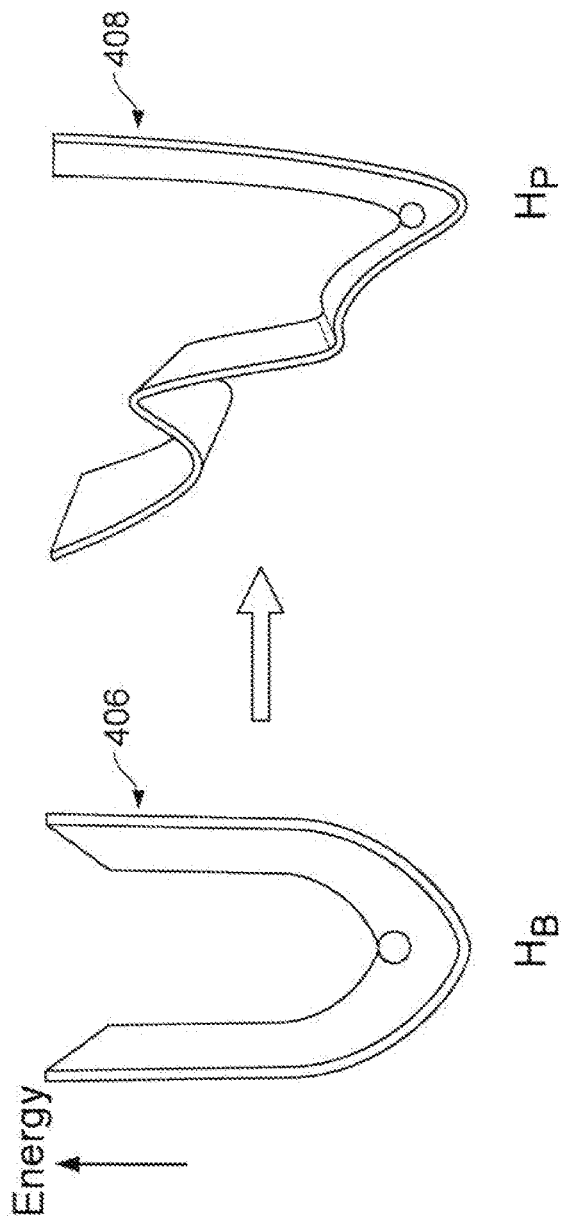
FIG. 4A is a schematic plot of two example Hamiltonians.
Figure 4B:
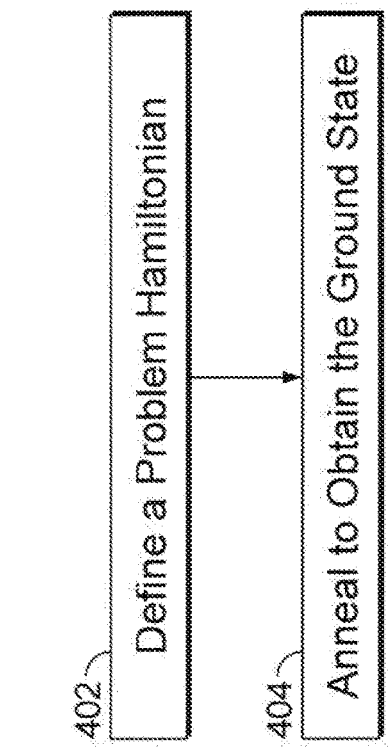
FIG. 4B is a flow diagram showing an example process of defining and annealing a Hamiltonian.

An example conventional process 400 using quantum annealing is shown in FIGS. 4A and 4B. First, a problem Hamiltonian $H_P$ is defined (402), e.g., as $H(t)=(1-t/T)H_B+t/T H_P$, where $H_B$ is an initial Hamiltonian with a known and easily preparable ground state, and $H_P$ is the problem Hamiltonian whose ground state encodes the solution to a given instance of an optimization problem, e.g., mapped from the model to be developed. Then, the problem Hamiltonian is annealed (404) to reach a ground state that provides the solution to the optimization problem. During the annealing process, quantum dynamical evolution adds alternative physical paths to escape local minima of the global energy due to quantum tunneling. The quantum oracle performs based on the possibility of multi-particle correlated quantum tunneling through local energy barriers, even when the system does not have enough thermal energy to jump over the energy barriers in a classical process employed in alternative algorithms, such as simulated annealing.

The Adiabatic Algorithms and their Implementations in Training Different Models

Boltzmann Machine

The Boltzmann machine is an example model which a quantum oracle can be used in training the model or part of the model. The following description is generally applicable to other exponential models. A trained Boltzmann machine can be used for solving a wide range of machine learning problems such as pattern matching problems, image recognition problems, speech recognition problems, voice recognition problems, and object recognition problems.

FIG. 1 is graphical representation of an example conventional Boltzmann machine 100. It is represented as a network of units 102, 104, 106, 108, 110, 112, 114. Each unit is connected with at least one unit through a connection 120. Sometimes not all units are visible units. For example, units 102, 104, 106 can be invisible or hidden units. Each unit is defined with an energy and is stochastic. Each connection 120 can be a parameter that represents the connection strength between the two units. In the example shown in the figure, the hidden units have interactions with each other and the visible units have interactions among themselves. Such a Boltzmann machine is also called an unrestricted Boltzmann machine.

A Boltzmann machine is trained in an iterative way: for the machine with parameters in a certain iteration, it generates samples from the equilibrium distribution of the machine, and then update the parameters based on the discrepancy of these samples and the observed training data.

Figure 5:
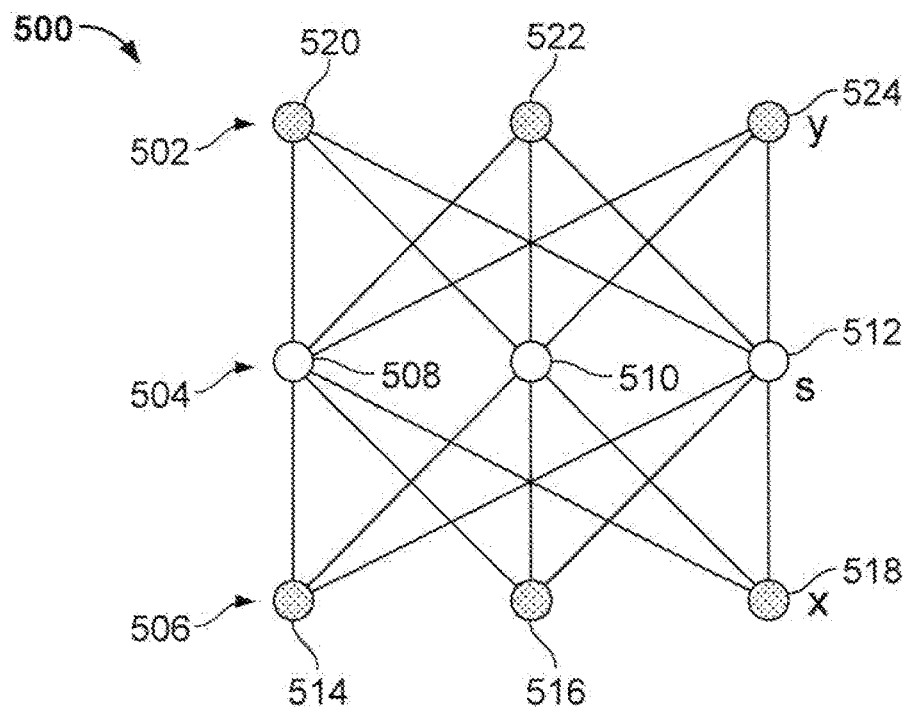
FIG. 5 is a schematic diagram of an example restricted Boltzmann machine.

FIG. 5 shows a graphical representation of an example restricted Boltzmann machine 500 with a reduced level of complication as compared to the Boltzmann model 100 of FIG. 1. The machine 500 contains a layer 504 of invisible/hidden units 508, 510, 512, and two layers 502, 506 of visible units 514, 516, 518; 520, 522, 524. The variables in the visible layers 502, 506 are denoted as x, y, respectively. In building the model, the variables x are the input, which will receive observed data, after the model is trained, and the variables y are the output. The variables in the hidden layer are labeled as s. The units within the same group do not interact with each other, and the units within different groups interact with each other.

The energy function E(x, y, s) of the restricted Boltzmann machine is:

$$-E = \sum_i \sum_j x_i w_{ij} s_j + \sum_s \sum_j y_a u_{nj} s_j + \sum_i a_i x_i + \sum_j b_j s_j + \sum_n c_n y_n,$$

and its probability distribution is:

$$p(x, y, s) = \frac{1}{Z} \exp(-E(x, y, s)).$$

In the above equations, i represents the number of visible units in the layer 506; n represents the number of visible units in the layer 502; and j represents the number of hidden units in the layer 504. The term $w_{ij}$ represents the interactions/connections between a hidden unit and a visible unit in the layer 506; and $v_{nj}$ represents the interactions/connections between a hidden unit and a visible unit in the layer 502. The terms $a_i$, $b_j$, and $c_n$ are weights for each unit.

Given a number of training samples the loss function of the restricted Boltzmann machine can be defined as:

$$L = -\log \sum_s p(\hat{x}, s, \hat{y})$$

$$= -\log \sum_s \exp(-E(\hat{x}, \hat{y}, s)) + \log \sum_{x,y,s} \exp(-E(x, y, s))$$

In order to minimize the loss function, each parameter $w_{ij}$ is selected based on a stochastic gradient, for example:
$w_{ij} \leftarrow w_{ij} - \gamma \partial L / \partial w_{ij}$.
The gradient of the loss function over $w_{ij}$ is:
$\partial L / \partial w_{ij} = -\hat{x}_i s_j^0 + x_i^1 s_j^1$
Where
$s_j^0 = \int p(s_j | \hat{x}, \hat{y}) s_j ds_j$
$x_i^1 s_j^1 = \int p(x_i, s_j) x_i s_j dx_i ds_j$
Generally, $x_i^1 s_j^1$ is difficult to obtain because of the dense inter-layer connections. When the variables x, y, and s are independent of each other, the distribution becomes:

$$p(s_j = 1 \mid x, y) = \left(1 + \exp\left(-\sum_i 2x_i w_{ij} - \sum_n 2y_n v_{nj} - 2b_j\right)\right)^{-1}.$$

In some implementations, $x^1$, $y^1$, and $s^1$ are approximated by the so-called contrastive divergence:
Sample $s^0$ from $p(s|\hat{x},\hat{y})$;
Sample $y^1$ from $p(y|s^0)$;
Sample $x^0$ from $p(x|s^0)$;
Sample $s^1$ from $p(s|x^1,y^1)$;
When a quantum machine is used to train a Boltzmann machine, the implementation may be able to restore at least some of the interactions among the hidden units. Such a modified restricted Boltzmann machine is named as a tempered interacting Boltzmann machine (TIBM). The TIBM can better resemble a neuron network and solve problems more precisely than the restricted Boltzmann machine. The TIBM is different from a restricted Boltzmann machine in at least two ways:

(1) Interactions are added among the hidden units s based on the hardware connections of the quantum machine, e.g., as illustrated in the Chimera graph of FIG. 3; and (2) Because the quantum machine can be used as an oracle that performs maximizations, the sampling in hidden layer is replaced by the maximization, which corresponds to temperature T=0.

The energy of the TIBM is:

$$-E = \sum_i \sum_j x_i w_{ij} s_j + \sum_n \sum_j y_n v_{nj} s_j + \sum_i a_i x_i + \sum_j b_j s_j + \sum_n c_n y_n + \sum_i \sum_{(j,k) \in E} x_i \overline{w}_{ijk} s_j s_k + \sum_n \sum_{(j,k) \in E} y_n \overline{v}_{njk} s_j s_k + \sum_{(j,k) \in E} \overline{b}_{jk} s_j s_k.$$

and its probability distribution is:

$$p(x, y, s) = \frac{1}{Z} \exp(-E(x, y, s)).$$

Figure 6:
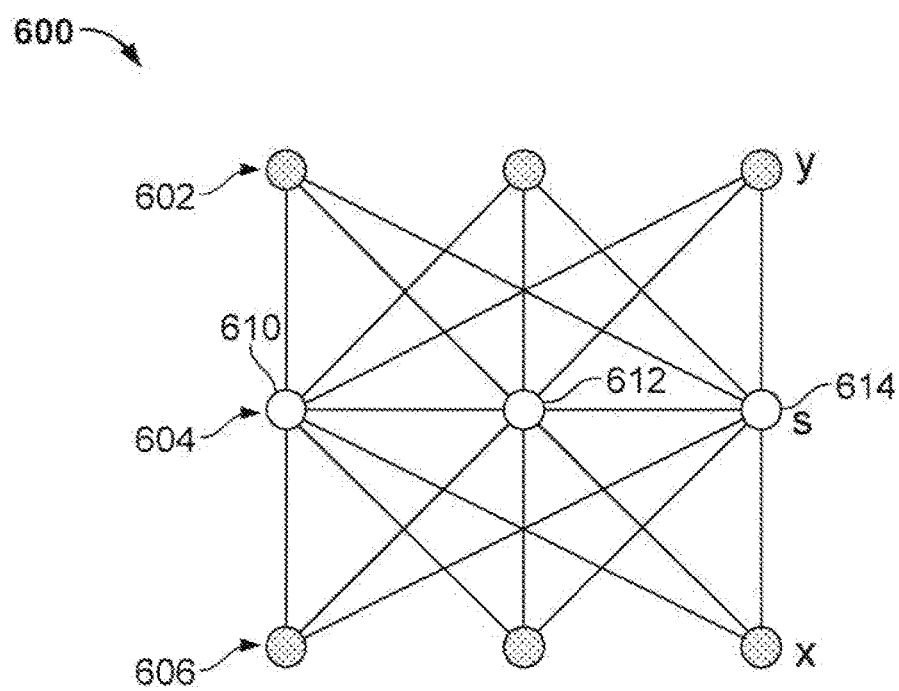
FIG. 6 is a schematic diagram of an example tempered interacting Boltzmann machine.

A graphical representation of an example TIBM 600 is shown in FIG. 6. The machine 600 contains three layers, two visible layers 602, 606, and an invisible layer 604. Compared to the restricted Boltzmann machine 500 of FIG. 5, units 610, 612, 614 of the invisible layer 604 interact with each other. At temperature T, the loss function of the TIBM is:

$$L_T = -\log \tilde{p}(\hat{x}, \hat{y}) = F_T(\log p)(\hat{x}, s, \hat{y}) + \log \sum_{x,y} \exp(F_T(\log p(x, s, y))).$$

In the above equation:

$$F_T(f(s)) = T \log \sum_s \exp(f(s)/T),$$

$$\tilde{p}(\hat{x}, \hat{y}) = \frac{1}{Z} \exp(F_T(\log p)(\hat{x}, s, \hat{y})),$$

and $$Z = \sum_{x,y} \exp(F_T \log p(x, s, y)).$$

When T is 0, $F_t(f(s)) \rightarrow \max_s f(s)$, then $$L_0 = -\log \tilde{p}_0(\hat{x}, \hat{y}) = -\log \frac{\max_s p(\hat{x}, s, \hat{y})}{\sum_{x,y} \max_{s'} p(x, s', y)}$$

$$= -\log \max_s p(\hat{x}, s, \hat{y}) + \log \sum_{x,y} \max_{s'} p(x, s', y).$$

The resulting contrastive divergence algorithm becomes:
Compute $s^0 = \text{argmax } p(s|\hat{x},\hat{y})$;
Sample $y^1$ from $p(y|s^0)$;
Sample $x^1$ from $p(x|s^0)$;
Compute $s^1 = \text{argmax } p(s|x^1,y^1)$;
To do contrastive divergence, the algorithm obtains (1) x, y will be the same as the algorithm for a restricted Boltzmann machine; and (2) s will need the quantum oracle, or approximate inference methods such as mean-field methods.

Figure 9:
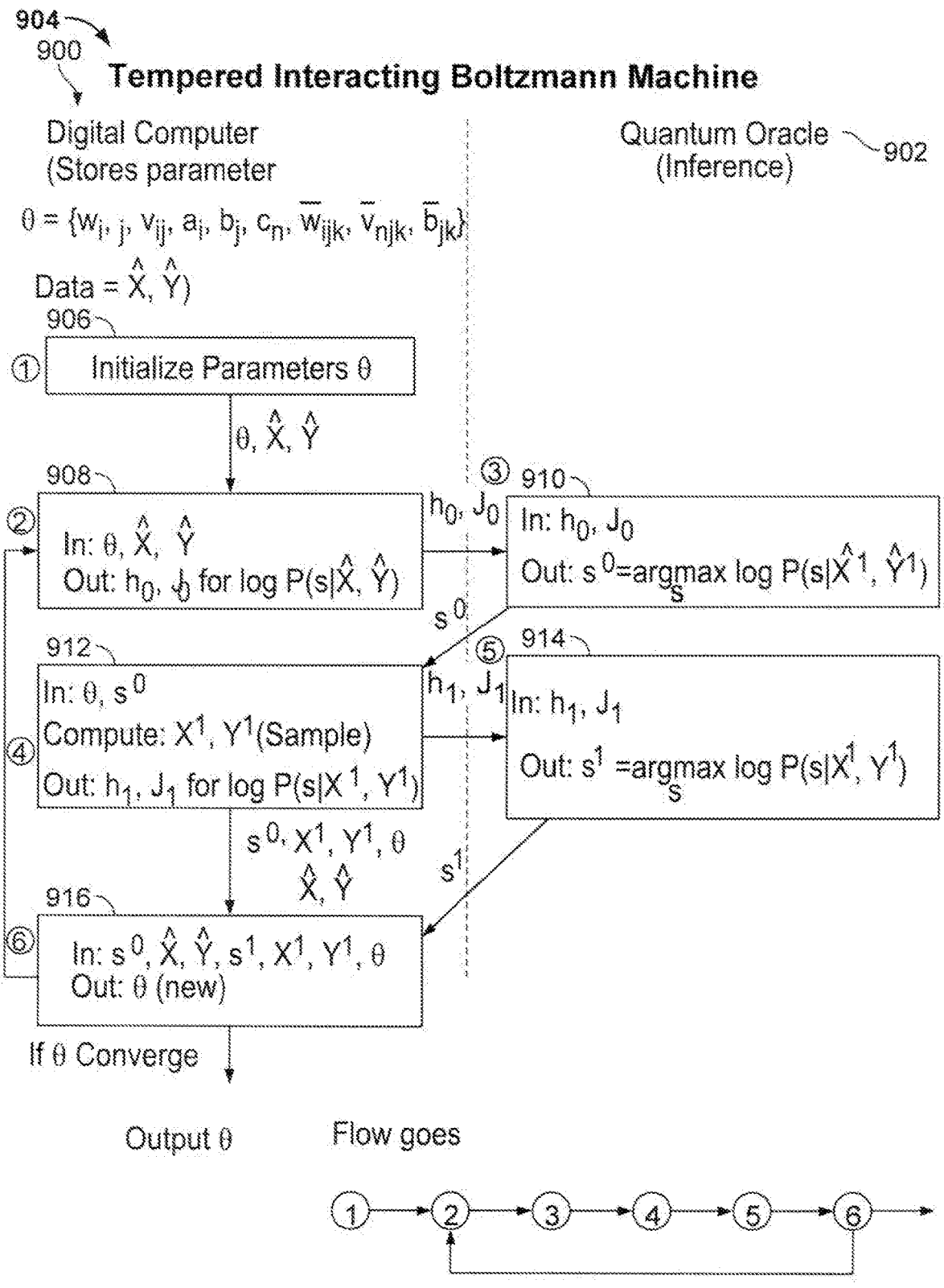
FIG. 9 is a flow diagram of an example process for learning an inference in a tempered interacting Boltzmann machine.

FIG. 9 shows an example process 904 performed by a digital computer 900 or system of multiple digital computers and a quantum oracle 902 to learn the inference in a tempered interacting Boltzmann machine (TIBM) and train the TIBM. The classical computer 900 stores a model parameter set $Q = \{w_{ij}, v_{ij}, a_i, b_j, c_n, \overline{w}_{ijk}, \overline{v}_{njk}, \overline{b}_{jk}\}$ and training data $\hat{x}$, $\overline{y}$. The quantum oracle 902 receives input from the classical computer 900 to do probabilistic inference and output model statistics to allow the classical computer 900 to complete training the TIBM.

In particular, the computer 900 initializes (906) the parameters in the set Q. Using the initialized parameter set Q and the training data $\hat{x}$, $\overline{y}$, the computer derives and outputs (908) $h_0$ and $J_0$ for log $p(s|\hat{x},\hat{y})$ to the quantum oracle 902. The quantum oracle 902 then performs adiabatic annealing and outputs (910) $s^0$ to the classical computer 900. The classable computer samples (912) $x^1$ and $y^1$, and based on $s^0$ and Q, calculates and outputs (912) $h_1$ and $J_1$ for log $P(s|x^1,y^1)$ to the quantum oracle 902. The quantum oracle again performs adiabatic annealing and outputs (914) $s^1$ to the classical computer 900. Based on $s^0$, $s^1$, $x^1$, $y^1$, $\hat{x}$, $\hat{y}$, and Q, the classical computer computes the new set of parameters Q. If the computed new Q has converged, the process of training the TIBM is completed. Otherwise, the new set of parameters replaces the initialized Q and the training process continues with the step 908 until the parameters converge.

Engineering Refinements for TIBM

In using the quantum oracle to evaluate the loss functions of different models for training the models, various engineering refinements can improve the performance of the adiabatic algorithms. Some of these are related to the following aspects or parameters:

Label margin: a margin $D(y, \hat{y})$ is added, which represents the scaled Hamming distance between y and $\hat{y}$, such that $$p(x, s, y) = \frac{1}{Z}\exp(E(x, s, y) + D(y, \hat{y})).$$

Weight regularization: an $L_2$ regularization, with regularization constant, of weights is added to the loss function.

Centering trick: the input feature x is centered by $x \leftarrow x - \alpha$, where $\alpha$ is the mean of x.

Initialization: the following can be initialized, where "all others" refers to parameters $v_{ij}$, $c_n$, $\overline{w}_{ijk}$, $\overline{v}_{njk}$, and $\overline{b}_{jk}$:
  $w_{ij} \sim 0.1 \cdot N(0, 1)$;
  $a_i = \log(\alpha_i/(1-\alpha_i))$;
  $b_j = -1$;
  all others are to be 0.

I-BM (interacting Boltzmann machine) pretraining:
  (1) Pre-train the corresponding TRBM (tempered restricted Boltzmann machine) with all edges in hidden layer being locked to 0;
  (2) Train the whole TIBM with unlocked edge parameters after TRBM pretraining.

Averaged stochastic gradient descent:
  (1) Learning rate reduces with iterations k;
  $\gamma = \eta(1 + \lambda k\eta)^{-0.75}$.
  (2) Averaging parameters as output.

$$\overline{w} \leftarrow \frac{k}{k+1}\overline{w} + \frac{1}{k+1}w.$$

Compatible ASGD (Averaged Stochastic Gradient Descent algorithm) with pretraining:
  (1) Reinitialize k=0 after pretraining.
  (2) Keep the current learning rate $\eta \leftarrow \gamma$.

Undirected Graphical Models

Figure 7:
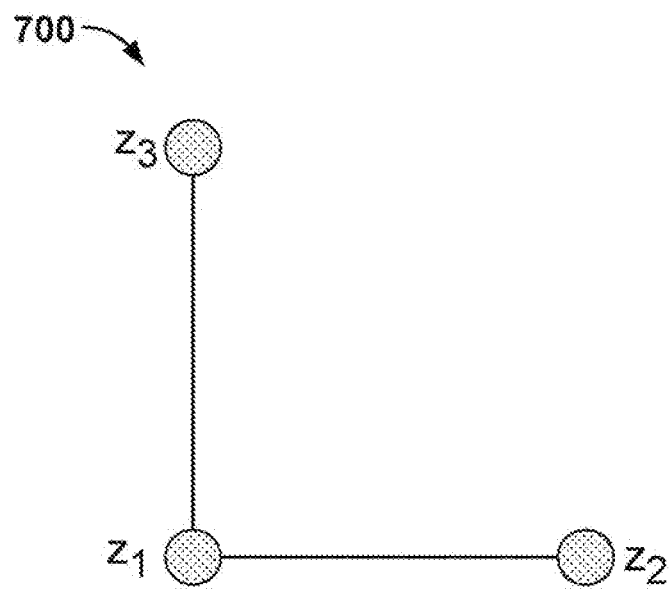
FIG. 7 is a schematic diagram of an example undirected graphical model.

As another example of using a quantum machine in a system for or process of training a model, e.g., an undirected graphical model or an exponential model, a three-unit model 700 is shown in FIG. 7. The 3-unit model 700 contains three labels $z = \{z_1, z_2, z_3\}$ as random binary variables. The joint distribution of $\{z_1, z_2, z_3\}$ is:

$$p(z_1, z_2, z_3) = \frac{1}{Z}\exp(h_1 z_1 + h_2 z_2 + h_3 z_3 + J_{12} z_1 z_2 + J_{23} z_2 z_3)$$

$$= \frac{1}{Z}\exp\left(\sum_i h_i z_i + \sum_{(i,j) \in E} J_{ij} z_i z_j\right)$$

$$= \frac{1}{Z}\exp(-E_{Ising}(z)),$$

Where:
$Z = \Sigma_z \exp(-E_{Ising}(z))$.

Given training data z, at least two methods can be used to train the model. The first method is to maximize the log-likelihood log p(z), $$L(h, J; \hat{z}) = E_{Ising}(\hat{z}) + \log\sum_z \exp(-E_{Ising}(z)).$$

The $\log \Sigma_z \exp f(z)$ is the special case of the tempered function with T=1, $$F_T(f) = T\log\sum_z \exp(f(z)/T).$$

When T=0, $$F_0(f) = \max_z f(z).$$

This leads to the loss function:

$$L(h, J; \hat{z}) = E_{Ising}(\hat{z}) + \max_z(-E_{Ising}(z)).$$

In this 3-unit example, both $\log \Sigma_z \exp(-E_{Ising}(z))$ and $\max_z(-E_{Ising}(z))$ are relatively simple. However, when the model is more complex and more variables are involved, the computational cost will grow exponentially with the number of variables. Accordingly, it is advantageous to compute the loss function L using a quantum oracle. For example, the D-Wave system as an oracle can be used to estimate the second term $\max_z(-E_{Ising}(z))$. The quantum oracle can be used to evaluate the gradient of the loss function as well.

Undirected Graphical Models with One or More Latent Variables

Figure 8:
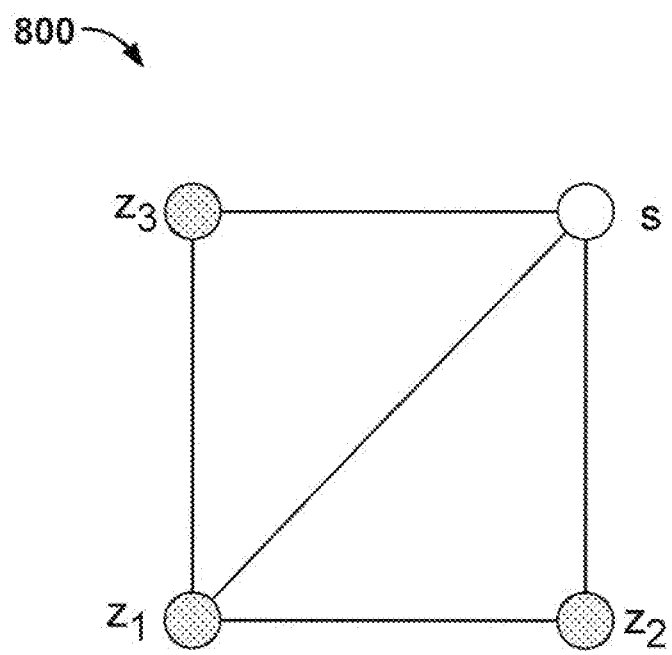
FIG. 8 is a schematic diagram of an example undirected graphical model with one or more latent variables.

FIG. 8 shows an undirected graphical model with latent variables 800, which can also be called a latent undirected graphical model. Compared to the model 700 of FIG. 7, a latent undirected graphical model includes one or more latent binary variable s; thus, the model 800 is capable of representing a rich family of distributions, in addition to first and second order interactions. The distribution function for the model 800 is:

$$p(z_1, z_2, z_3, s) = \frac{1}{Z}\exp(h_1 z_1 + h_2 z_2 + h_3 z_3 h_s s + J_{12} z_1 z_2 + J_{23} z_2 z_3 + J_{1s} z_1 s + J_{2s} z_2 s + J_{3s} z_3 s)$$

$$= \frac{1}{Z}\exp(-E_{Ising}(z, s))$$

Because s is not observed, there are at least two ways to define the loss function. The first way is to sum over s and define the loss function as $-\log \Sigma_s p(\hat{z}, s)$ such that $$L = -\log\left(\sum_s \exp(-E_{Ising}(\hat{z}, s))\right) + \log\left(\sum_{z,s} \exp(-E_{Ising}(z, s))\right).$$

The other way is to maximize over s, and define the loss function as:

$$L = -\max_{s}\{-E_{Ising}(\hat{z}, s)\} + \max_{z,s}\{-E_{Ising}(z, s)\}.$$

The quantum oracle can be readily applied to this loss function to solve the inference of the two max problems.

Figure 10:
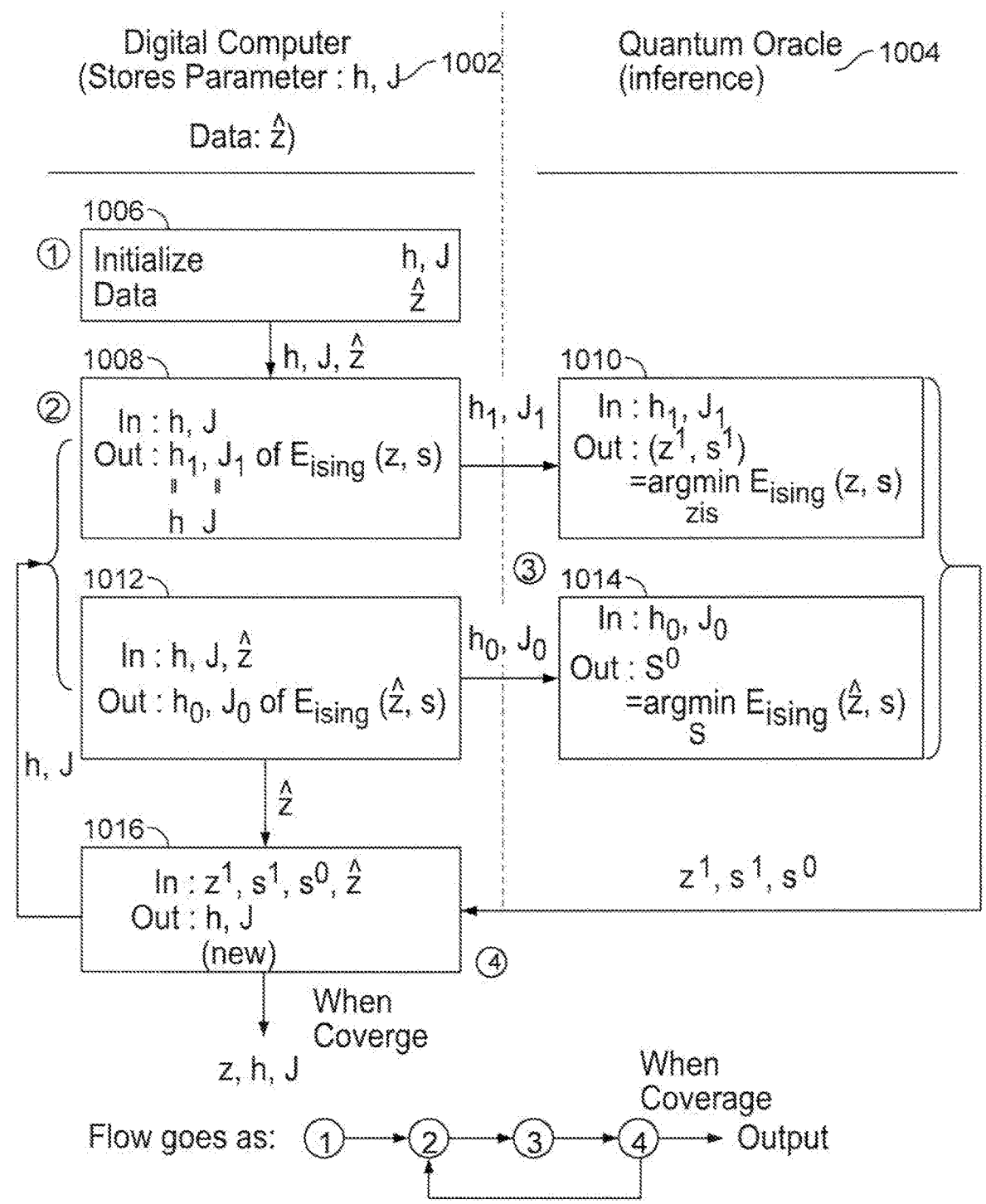
FIG. 10 is a flow diagram of an example process for learning an inference in an undirected graphical model with latent variables.

FIG. 10 shows an example process 1000 in which a digital computer 1002 or system of multiple digital computers and a quantum oracle 1004 learn the inference in an undirected graphical model with one or more latent variables and train the undirected graphical model. The classical computer 900 stores model parameters $h_i$ and $J_{ij}$ and training data $\hat{z}$. The quantum oracle 1004 receives input from the classical computer 1002 to learn the inference and outputs data to allow the classical computer 1004 to complete training the model.

The process 1000 starts with the classical computer 1002 initializes (1006) the parameters $h_i$ and $J_{ij}$, and calculates and outputs (1008) $h_1$ and $J_1$ of $E_{Ising}(z, s)$ to the quantum oracle 1004. In addition, the classical computer 1002 also computes and outputs (1012) to the quantum oracle 1004 $h_0$ and $J_0$ of $E_{Ising}(\hat{z}, s)$ based on the initialized parameters $h_i$ and $J_{ij}$ and the training data $\hat{z}$. Based on the received parameters $h_1$ and $J_1$, the quantum oracle 1004 computes and outputs (1010) $(z^1, s^1)$=argmin $E_{Ising}(z, s)$; and based on the received parameters $h_0$ and $J_0$, the quantum oracle 1004 computes and outputs (1014) $s^0$=argmin $E_{Ising}(\hat{z}, s)$. The classical computer 1002 then calculates (1016) and outputs new parameters $h_i$ and $J_{ij}$ based on $z^1$, $s^1$, $s^0$, and $\hat{z}$. If the computed new parameters $h_i$ and $J_{ij}$ have converged, the process of training the undirected graphical model is completed. Otherwise, the new parameters replace the initialized parameters and the training process continues with the step 1008 until the parameters converge.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable digital processor, a digital computer, or multiple digital processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). For a system of one or more computers to be "configured to" perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can be implemented as an apparatus, method, or electronic system that may include one or more processing devices and memory to store executable instructions to perform the operations described in this specification.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous. In another example, the implementation of a quantum oracle in learning the inference and training models can be alternatively performed by systems that are different from the D-Wave systems or the AQC systems. For example, a universal quantum computer that relies on quantum phase estimation algorithms to find the ground state of the problem Hamiltonian can be used. Also, in addition to the models discussed above, there are many other supervised and unsupervised machine learning algorithms, for use in classifications, clustering, and inference tasks. A quantum information processor can be used in association with part or all of these algorithms during the training stage, the performance stage, or both stages of the algorithms. In another example, in addition to the training stage, a quantum oracle may also be used for inference during the prediction stage, i.e., at the performance stage, during which loss functions of different candidate output labels are compared. The best candidate output label can be selected based on the lowest loss function value. The systems and methods described in the specification can be used in connection with cloud computing, e.g., to provide training or predicting services to a cloud architecture.

What is claimed is:

1. A method performed by a quantum machine, comprising:
   receiving, as input at a quantum machine comprising an adiabatic quantum computing system having hardware connections comprising couplers that connect qubits included in the quantum machine, data for learning an inference in a model used in machine learning, wherein:
   the model is a modified restricted Boltzmann machine that includes interactions among hidden units of the restricted Boltzmann machine, wherein the interactions are based on the hardware connections of the quantum machine;
   the input maps at least some interactions of different interconnected units of the model to the hardware connections between qubits in the quantum machine; and
   the input is derived using data for training the model and a state of the model, the data comprising observed data for training and validating the model; and
   learning, by the quantum machine, the inference in the model; and
   providing, as output from the quantum machine, data representing the learned inference.

2. The method of claim 1, wherein the model comprises hidden units and visible units, and one or more hidden units interconnect with at least one visible unit.

3. The method of claim 2, wherein the model is an undirected graphical model and the hidden units are latent variables of the model.

4. The method of claim 1, wherein the hardware connections in the quantum machine are defined by a Chimera graph.

5. The method of claim 1, wherein learning the inference in the model comprises learning part of the inference in the model.

6. A quantum system, comprising:
   an adiabatic quantum computing system having hardware connections comprising couplers that connect qubits included in the adiabatic quantum computing system;
   wherein the quantum system is configured to perform operations comprising:
   receiving, as input, data for learning an inference in a model used in machine learning, wherein:
   the model is a modified restricted Boltzmann machine that includes interactions among hidden units of the restricted Boltzmann machine, wherein the interactions are based on the hardware connections of the adiabatic quantum computing system;
   the input maps at least some interactions of different interconnected units of the model to the hardware connections between qubits in the adiabatic quantum computing system; and
   the input is derived using data for training the model and a state of the model, the data comprising observed data for training and validating the model;

learning, by the quantum system, the inference in the model; and providing, as output from the quantum system, data representing the learned inference.

7. The system of claim 6, wherein the model comprises hidden units and visible units, and one or more hidden units interconnect with at least one visible unit.

8. The system of claim 7, wherein the model is an undirected graphical model and the hidden units are latent variables of the model.

9. The system of claim 6, wherein the hardware connections in the adiabatic quantum computing system are defined by a Chimera graph.

10. The system of claim 6, wherein learning the inference in the model comprises learning part of the inference in the model.

* * * * *